(12) United States Patent
Graber et al.

(10) Patent No.: US 10,266,096 B1
(45) Date of Patent: Apr. 23, 2019

(54) RECREATIONAL VEHICLE WITH DECK

(71) Applicant: Highland Ridge RV, Inc., Middlebury, IN (US)

(72) Inventors: Randall L. Graber, Elkhart, IN (US); Jason T. Martin, Elkhart, IN (US)

(73) Assignee: JAYCO, INC., Middlebury, IN (US)

( * ) Notice: Subject to any disclaimer, the term of this patent is extended or adjusted under 35 U.S.C. 154(b) by 78 days.

(21) Appl. No.: 15/193,159

(22) Filed: Jun. 27, 2016

Related U.S. Application Data

(60) Provisional application No. 62/185,133, filed on Jun. 26, 2015.

(51) Int. Cl.
*B60P 1/43* (2006.01)
*B60P 3/32* (2006.01)
*B60P 3/06* (2006.01)

(52) U.S. Cl.
CPC ............. *B60P 3/32* (2013.01); *B60P 1/43* (2013.01); *B60P 3/06* (2013.01)

(58) Field of Classification Search
CPC ............... B60P 3/34; B60P 3/32; B60P 3/341
USPC ........................................................ 296/158
See application file for complete search history.

(56) References Cited

U.S. PATENT DOCUMENTS

| | | | | |
|---|---|---|---|---|
| 5,899,518 | A * | 5/1999 | Schreiner | B60P 3/36 108/44 |
| 6,371,719 | B1 * | 4/2002 | Hildebrandt | B60P 1/435 14/69.5 |
| 6,736,446 | B1 * | 5/2004 | Johnson | B60P 3/36 296/162 |
| 7,410,205 | B2 * | 8/2008 | Cardwell | B60P 3/36 296/162 |
| 7,686,381 | B1 * | 3/2010 | Leonard | B60P 3/343 296/162 |
| 7,841,645 | B2 * | 11/2010 | Diamond | B60P 3/34 108/44 |
| 8,528,962 | B2 * | 9/2013 | Wilkie | B60P 3/36 296/162 |
| 2006/0158004 | A1 * | 7/2006 | Harris | B60P 3/341 296/176 |
| 2009/0065543 | A1 * | 3/2009 | Bone | B60P 3/122 224/500 |
| 2017/0072829 | A1 * | 3/2017 | Cripe | B60P 3/34 |

* cited by examiner

*Primary Examiner* — Pinel E Romain
(74) *Attorney, Agent, or Firm* — Ryan M. Fountain

(57) ABSTRACT

A recreational vehicle with a deck includes an enclosure structure for selectively enclosing all or a portion of the deck. Components of the enclosure structure can be used as a ramp for loading and unloading items from the deck.

21 Claims, 9 Drawing Sheets

RECREATIONAL VEHICLE WITH DECK

The present invention relates to recreational vehicles and, more particularly, to a recreational vehicle with a deck on which motorcycles, ATVs and/or other objects may be stored and transported.

SUMMARY OF THE INVENTION

In one embodiment of the present invention, a recreational vehicle has at least two walls for defining an interior space and a deck for supporting items exterior to the interior space of the recreational vehicle. The recreational vehicle further includes a support structure having a first side support member having a first end adjacent a wall of the recreational vehicle and a second end, a second side support member having a first end adjacent a wall of the recreational vehicle and a second end, a first front support member having a first end connected to the second end of the first side support member and a second end, the first front support member extending at an angle from the first side support member and a second front support member having a first end connected to the second end of the second side support member and a second end connected to the second end of the first front support member, the second front support member extending at an angle to the second side support member. A deck surface is connected to the first and second side support members and to the first and second front support members. First and second connection members are connected to the first side support member and second and third connection members are connected to the second side support member. A first side enclosure member is removably connectable to the first and second connection members and a second side enclosure member is removably connectable to the third and fourth connection members. The recreational vehicle further includes a support member having a first section having a first end removably connectable to the support structure adjacent the second ends of the first front support member and the second front support member and a second end. A first arm extends generally perpendicular to the first section between the first and second ends and a second arm extends generally perpendicular to the first section adjacent the second end. A first front enclosure member is removably connectable to the first side enclosure member and the enclosure support member. A second front enclosure member is removably connectable to the second side enclosure member and the enclosure support member. The first and second side enclosure members and the first and second front enclosure members can be connected to the deck support structure so as to fully or partially enclose the deck surface. The first and second side enclosure members are positionable on the support structure so as to form a ramp for loading and unloading items from the deck surface.

In one embodiment of the invention, the second end of the first side enclosure member nests within the first end of the first front enclosure member when the first side enclosure member and first front enclosure member are connected to the support structure to at least partially enclose the deck surface.

In another embodiment of the present invention, the first side enclosure member nests within the first connection member when the first side enclosure member is connected to the support structure to at least partially enclose the deck surface.

In another embodiment, the enclosure support member nests within the first front enclosure member when the first front enclosure member is connected to the support structure to at least partially enclose the deck surface. The first arm of the enclosure support member can nest within the first front enclosure member when the first front enclosure member is connected to the support structure to at least partially enclose the deck surface. The second arm of the enclosure support member can also nest within the first front enclosure member when the first front enclosure member is connected to the support structure to at least partially enclose the deck surface.

In another embodiment of the present invention, a portion of the enclosure support member nests within the second front enclosure member when the first front enclosure member and the second front enclosure member are connected to the support structure to at least partially enclose the deck surface.

In one embodiment of the invention, the recreational vehicle further includes an opening in the support structure adjacent the second end of the first front support member and the second end of the second front support member. The opening is configured to receive the first end of the enclosure support member.

In another embodiment of the invention, the recreational vehicle further includes a first support member connected to the first end of the first side enclosure member and a second support member connected to the first end of the second side enclosure member. The first and second support members are configured to support the first side enclosure member and the second side enclosure member on the support structure when the first side enclosure member and the second side enclosure member are positioned on the support structure to form a ramp. The first and second support members may be disposed at an angle to the first and second side enclosure members, respectively.

In other embodiments of the present invention, the first side support member, second side support member, first front support member and second front support member form a first generally rectangular or square area and a second generally triangular area.

A recreational vehicle according to another embodiment of the present invention includes a deck, an enclosure structure and a support member. The deck has a first area having a first side and a second side and a second generally triangular area having a first side and a second side. The enclosure structure has a first enclosure member removably connectable to the deck so as to extend along the first side of the first area of the deck, a second enclosure member removably connectable to the deck so as to extend along the second side of the first area of the deck, a third enclosure member removably connectable to the deck so as to extend along the first side of the triangular area of the deck and a fourth enclosure member removably connectable to the deck so as to extend along the second side of the triangular area of the deck. The first enclosure member is removably connectable to the third enclosure member and the second enclosure member is removably connectable to the fourth enclosure member. The support member is removably connectable to the deck and has a first section extending generally perpendicular to the deck when the support member is connected to the deck. The first section has a first end and a second end. A first arm is located adjacent the first end of the first section and extends generally perpendicular to the first section. A second arm is located between the first and second ends of the first section and extends generally perpendicular to the first section. The third enclosure member is removably connectable to the first and second arms of the support member and the fourth enclosure member is removably connectable to the first and second arms of the support member.

In another embodiment of the present invention, a first member is connected to the first enclosure member and a second member is connected to the second enclosure member. The first and second members are configured to support the first and second enclosure members on the deck to form a ramp for loading and unloading items from the deck.

According to another embodiment of the invention, the first enclosure member nests within the third enclosure member when the first enclosure member and third enclosure member are connected to the deck. In another embodiment, the first and second arms of the support member nest within the third enclosure member when the third enclosure member is connected to the support member.

In yet another embodiment of the present invention, the recreational vehicle further includes an opening adjacent the first and second sides of the triangular area of the deck. The opening is configured to receive one end of the first section of the support member.

Another embodiment of the invention includes means for removably connecting the first enclosure member to the deck. The means may include a bracket and a pin.

Another embodiment includes means for connecting the first enclosure member to the third enclosure member. The means may include a pin.

DETAILED DESCRIPTION OF THE EMBODIMENTS OF THE INVENTION

Figure 1:
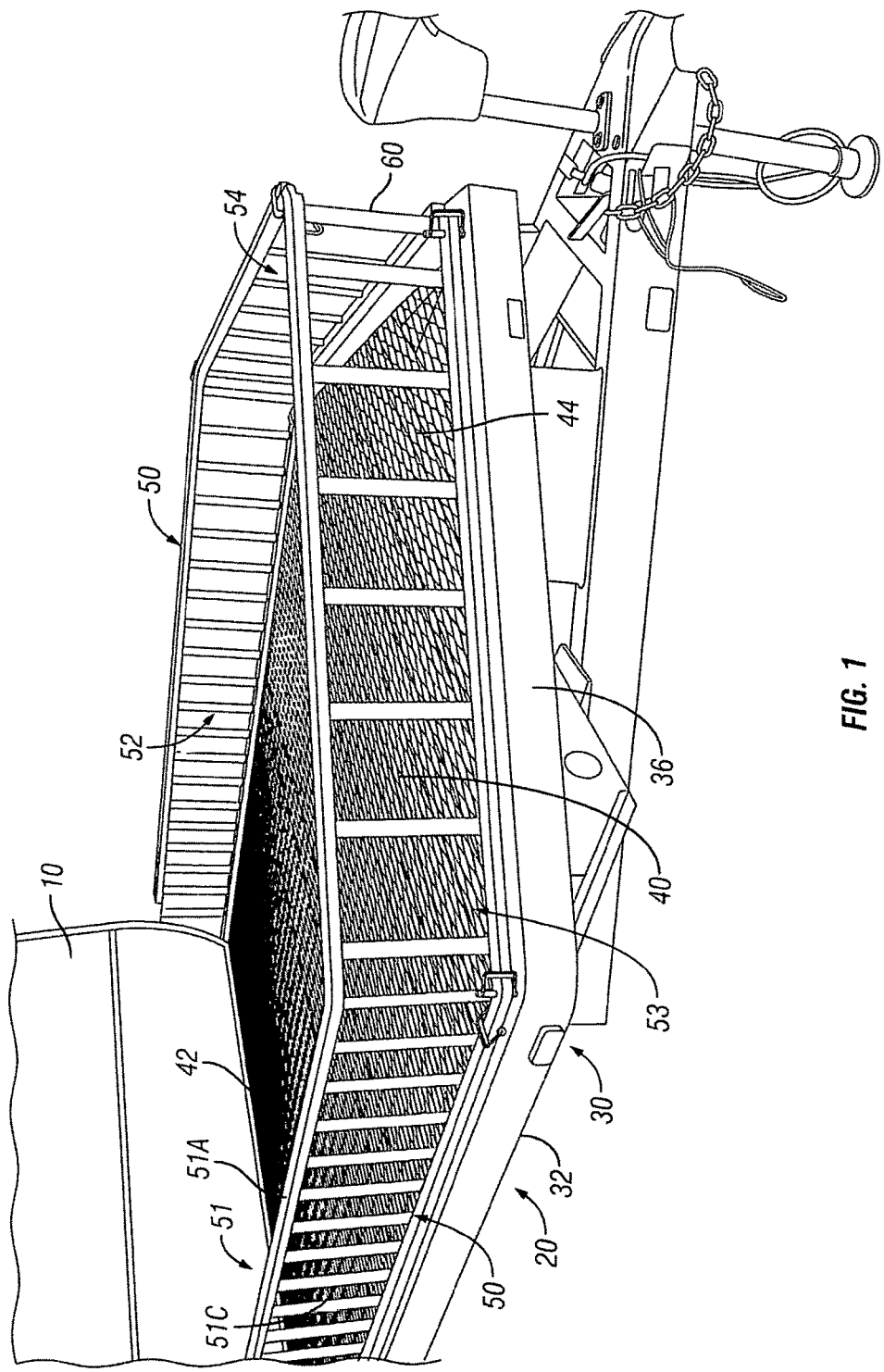
FIG. 1 is a perspective view of a recreational vehicle with deck according to one embodiment of the present invention.
Figure 2:
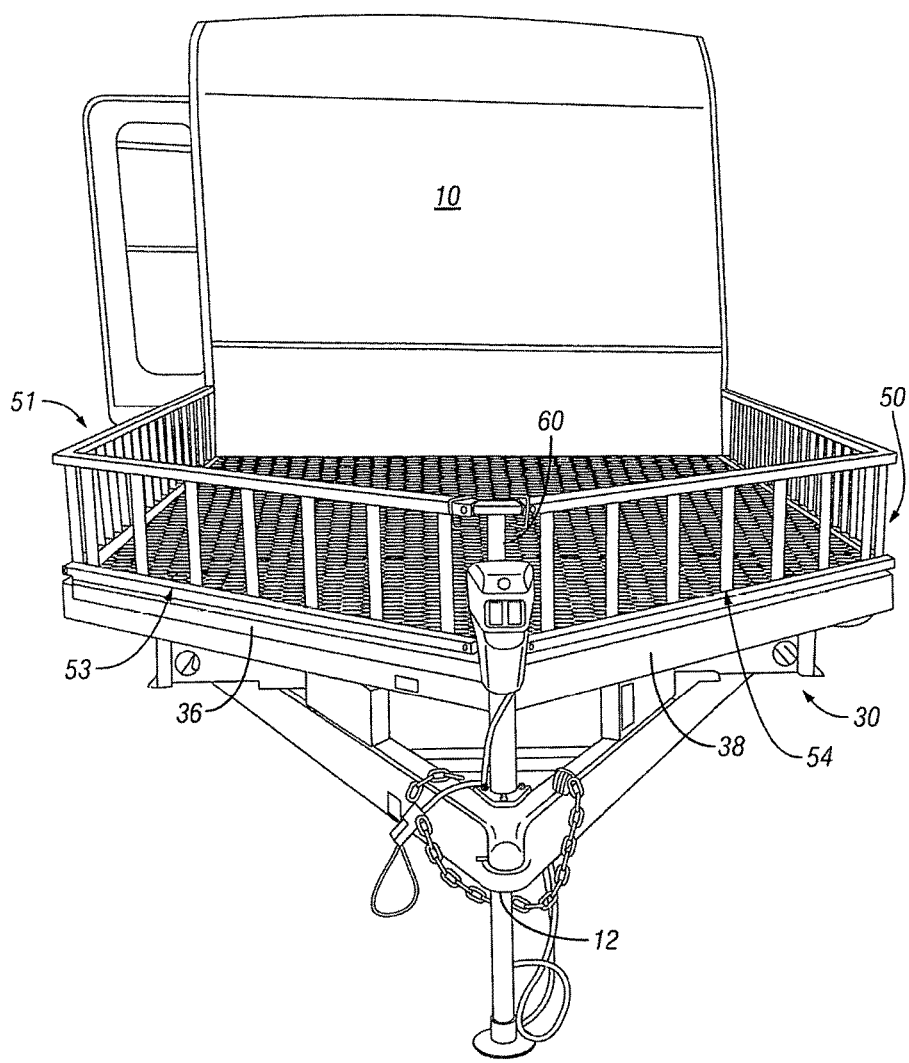
FIG. 2 is a front elevation view of the recreational vehicle shown in FIG. 1.
Figure 3:
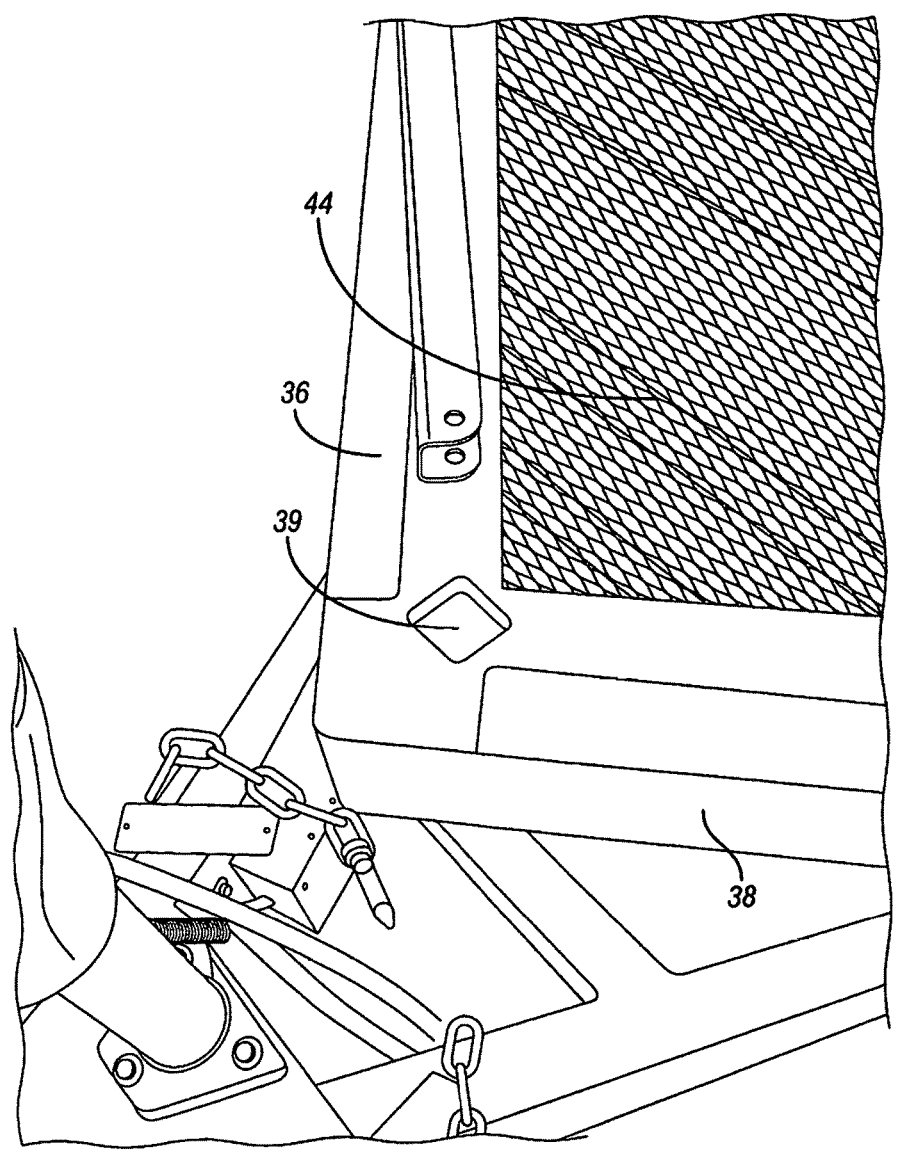
FIG. 3 is a top plan view of a portion of the deck shown in FIG. 1.
Figure 4:
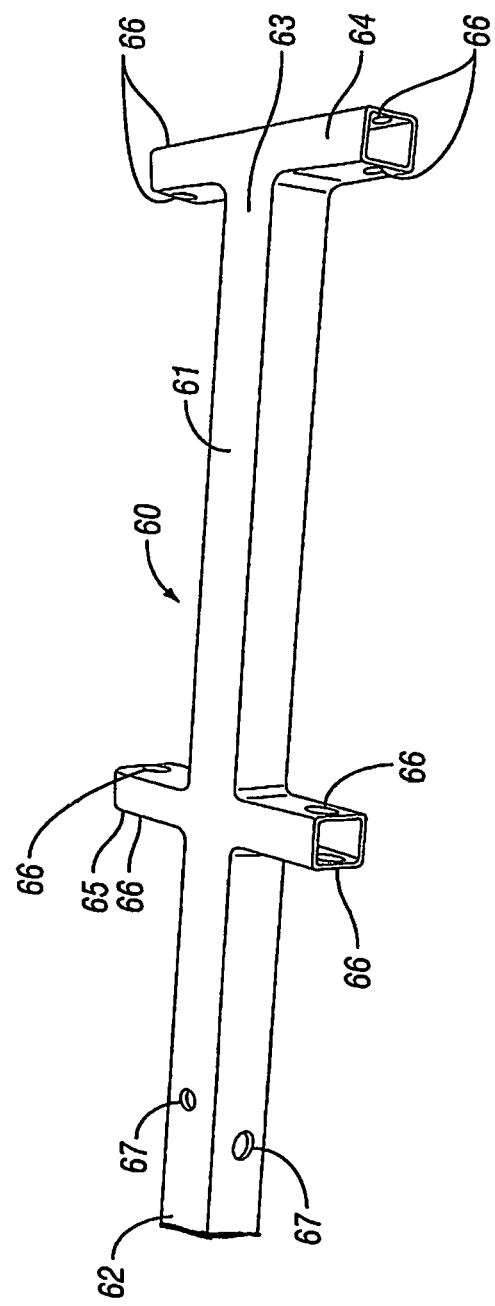
FIG. 4 is a perspective view of a support member that is a component of the deck shown in FIG. 1.

Referring to FIGS. 1-3 a recreational vehicle 10 according to the present invention generally includes a deck structure 20. Deck structure 20 generally includes a support structure 30, a deck surface 40 and an enclosure 50.

In the embodiment shown, support structure 30 generally includes a first side section 32, a second side section 34, a first front section 36 extending from one end of first side section 32 and a second front section 38 extending from one end of second side section 34 and connecting at its opposite end to an end of first front section 36. An opening 39 is located near the intersection of first front section 36 and second front section 38.

In the embodiment shown, support structure 30 and deck surface 40 extend from recreational vehicle 10 toward vehicle hitch 12 so as to form a generally square or rectangular area 42 and a generally triangular area 44.

In the embodiment shown, enclosure 50 generally includes a first side member 51, a second side member 52, a first front member 53 and a second front member 54. First side member 51, second side member 52, first front member 53 and second front member 54 are removably secured to support structure 30, as described in greater detail below.

In the embodiment shown, first side member 51 generally includes a first or upper member 51A and a second or lower member 51B joined together by a plurality of bars or connecting members 51C. Upper member 51A and lower member 51B are generally C-shaped channels. First side member 51 has a first end 51D adjacent recreational vehicle 10 and a second end 51E. First end 51D includes a support member 51F. In the embodiment shown, support member 51F is a metal plate that bends inward toward the center of deck structure 20 when first side member 51 is secured to support structure 30 as shown in FIGS. 1 and 2.

Second side member 52 generally includes a first or upper member 52A and a second or lower member 52B joined together by a plurality of bars or connecting members 52C. Upper member 52A and lower member 52B are generally C-shaped channels. Second side member 52 has a first end 52D adjacent recreational vehicle 10 and a second end 52E. First end 52D includes a support member 52F.

First front member 53 generally includes a first or upper member 53A and a second or lower member 53B joined together by a plurality of bars or connecting members 53C. Upper member 53A and lower member 53B are generally C-shaped channels. First front member 53 has a first end 53D and a second end 53E. First end 53D is located adjacent second end 51E of first side member 51 when first side member 51 and first front member 53 are secured to support structure 30 as shown in FIGS. 1 and 2.

Second front member 54 generally includes a first or upper member 54A and a second or lower member 54B joined together by a plurality of bars or connecting members 54C. Upper member 54A and lower member 54B are generally C-shaped channels. Second front member 54 has a first end 54D and a second end 54E. First end 54D is located adjacent second end 52E of second side member 52 when second side member 52 and second front member 54 are secured to support structure 30 as shown in FIGS. 1 and 2.

Figure 5:
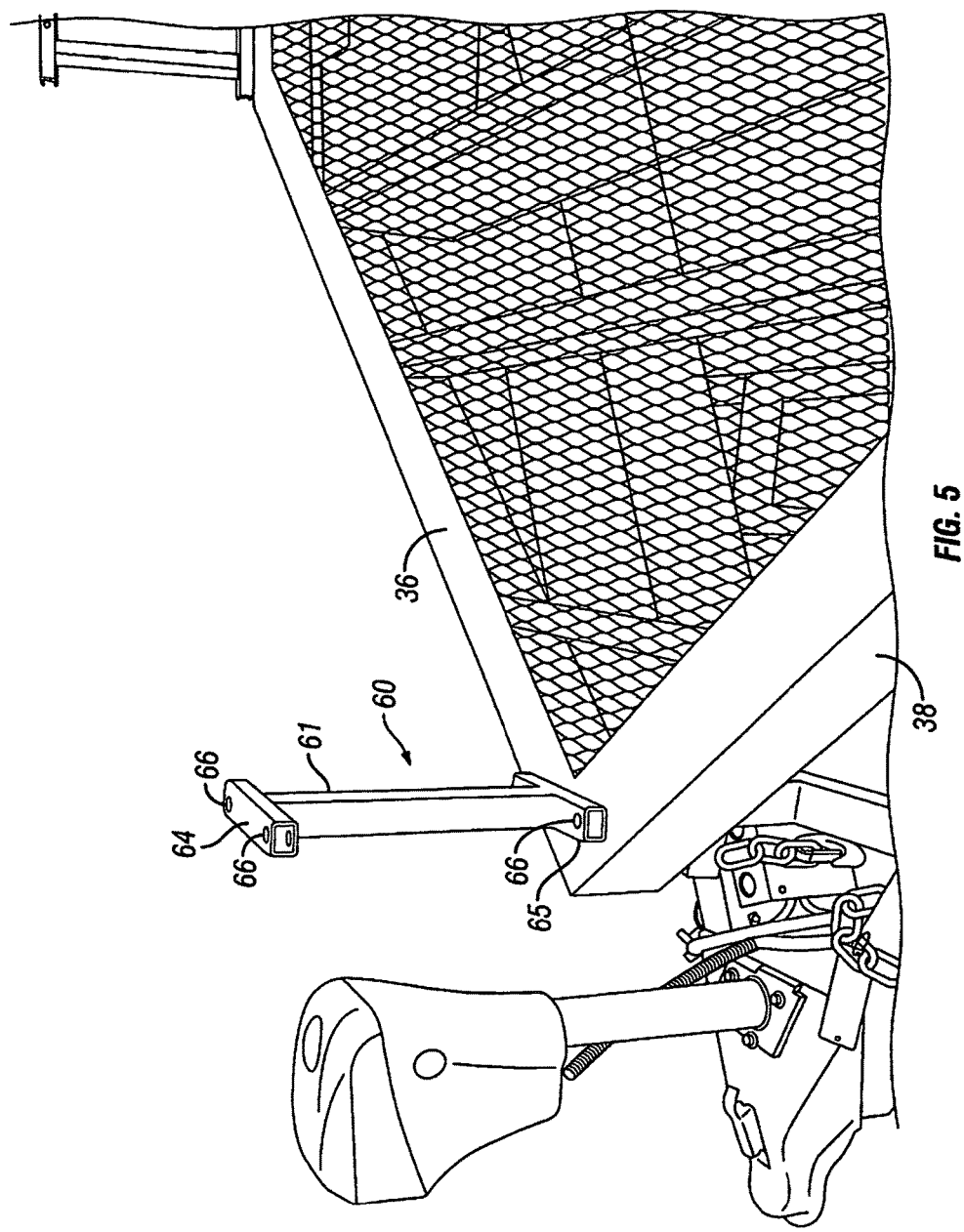
FIG. 5 is a perspective view of the support member shown in FIG. 4 secured to the deck shown in FIG. 1.

Enclosure 50 further includes a front support member 60. In the embodiment shown, support member 60 generally includes a central or body section 61 having a first end 62 and a second end 63. A first generally perpendicularly extending arm 64 is located at or near second end 63. A second generally perpendicularly extending arm 65 is located between first end 62 and second end 63 along central section 61. In the embodiment shown, support member 60 is constructed from tubular steel having a generally square cross-section. A plurality of openings 66 extend through arms 64 and 65. A plurality of openings 67 extend through central section 61 between first end 62 and second arm 65. As shown in FIGS. 1, 2 and 5, first end 62 of support member 60 extends into opening 39 in support structure 30 and may be secured in place by inserting a pin or other structure through one or more of openings 67 below support structure 30. Second arm 65 rests on or is located near the upper surface of support structure 30 when support member 60 is engaged in opening 39.

Figure 6:
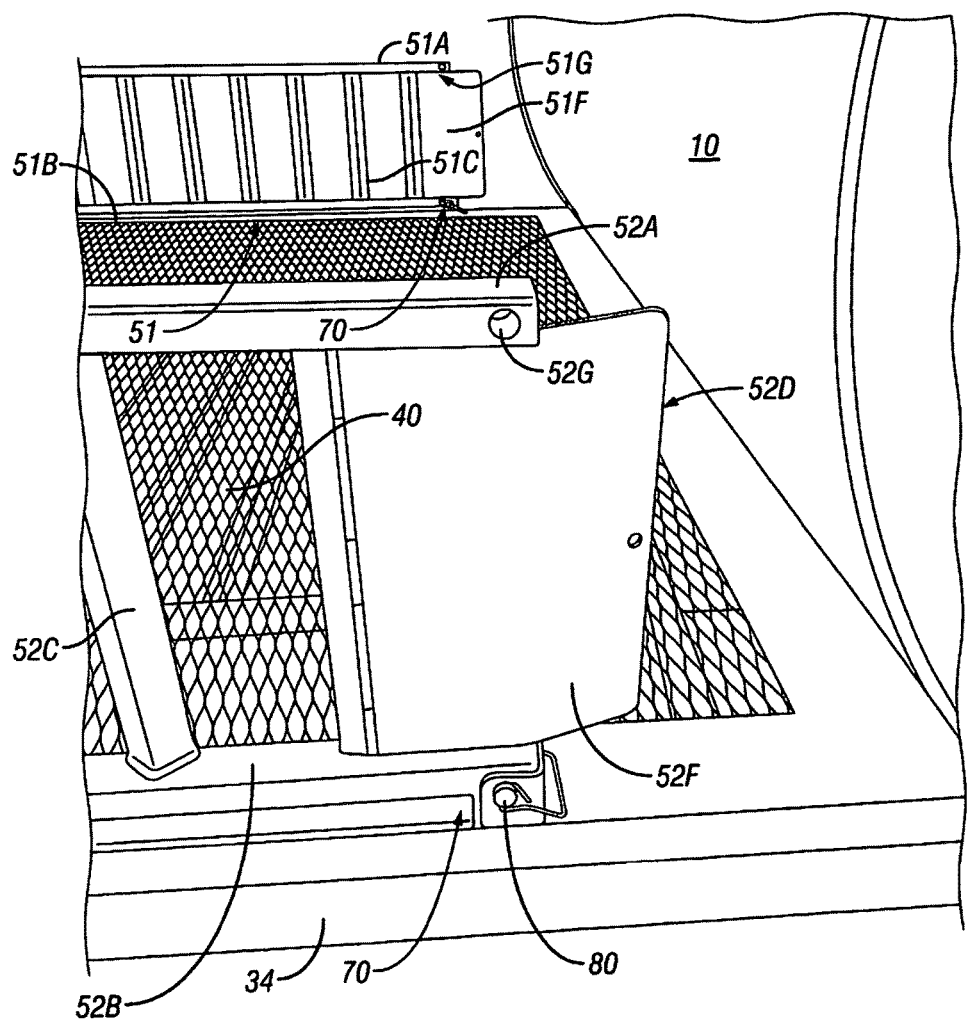
FIG. 6 is a perspective view of a portion of the deck shown in FIG. 1.

Referring to FIG. 6, a first bracket or connection structure 70 is connected to second side member 34 of support structure 30 near recreational vehicle 10. In the embodiment shown, connection member 70 is a bracket having a pair of spaced-apart sides or ears with openings extending therethrough. First end 52D of second side member 52 sits between the sides or ears of connection member 70 and is secured thereto by inserting a pin-and-latch member 80 through the openings in the sides or ears and through openings 52G in lower member 52B for second side member 52. Note that openings 52G are also formed in upper member 52A of second side member 52 adjacent first end 52D. First end 51D of first side member 51 is secured to first side member 32 of support structure 30 in the same manner. Note that because openings 52G and 51G are located in members 51A, 51B, 52A and 52B, first side member 51 and second side member 52 are interchangeable and may be installed on either side of the support structure 30.

Figure 7:
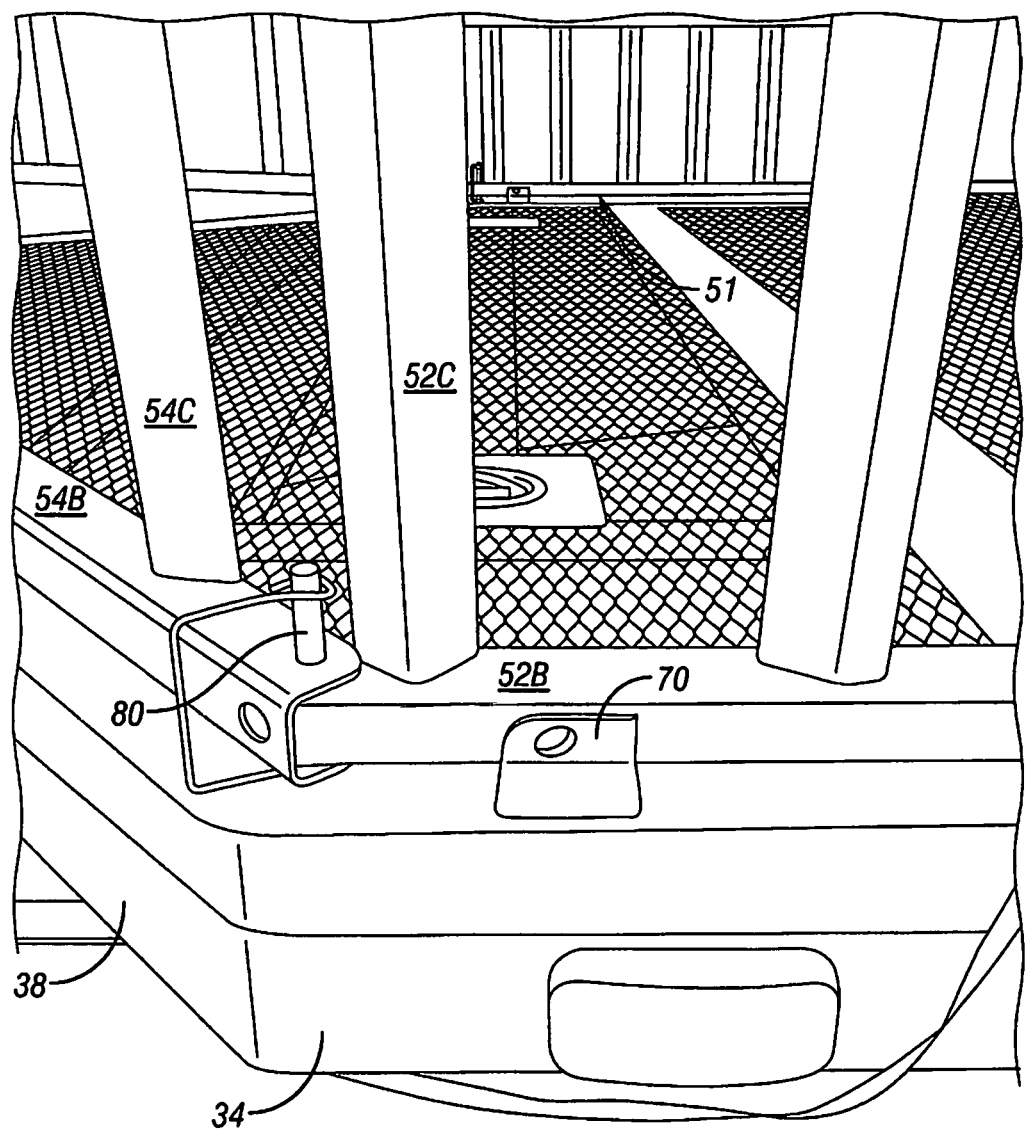
FIG. 7 is a perspective view of a portion of the deck shown in FIG. 1.

As shown in FIG. 7, at second end 52E of second side member 52, lower member 52B nests within lower member 54B of second front member 54 and is secured thereto by inserting a pin and latch member 80 through openings in members 52B and 54B. A connection structure 70 is located on second side member 34 of support structure 30 near end 52E of second side member 52 to permit second end 52E to be secured in place by inserting a pin and latch member 80 (not shown) therethrough. Lower member 51B of first side member 51 is secured to first side member 32 of support structure 30 and to lower member 53B of first front member 53 in the same manner as described above for second side member 52.

Figure 8:
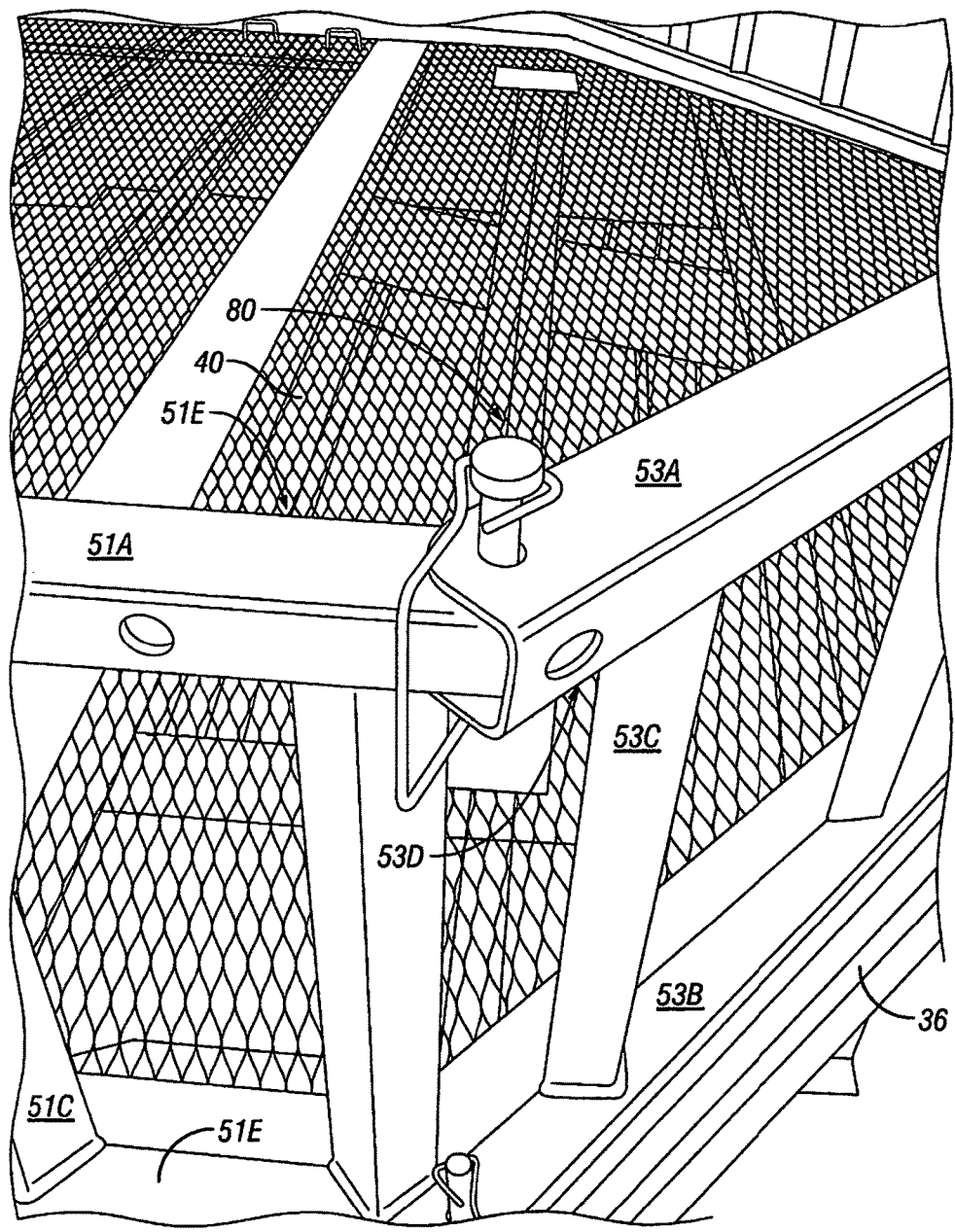
FIG. 8 is a perspective view of a portion of the deck shown in FIG. 1.
Figure 9:
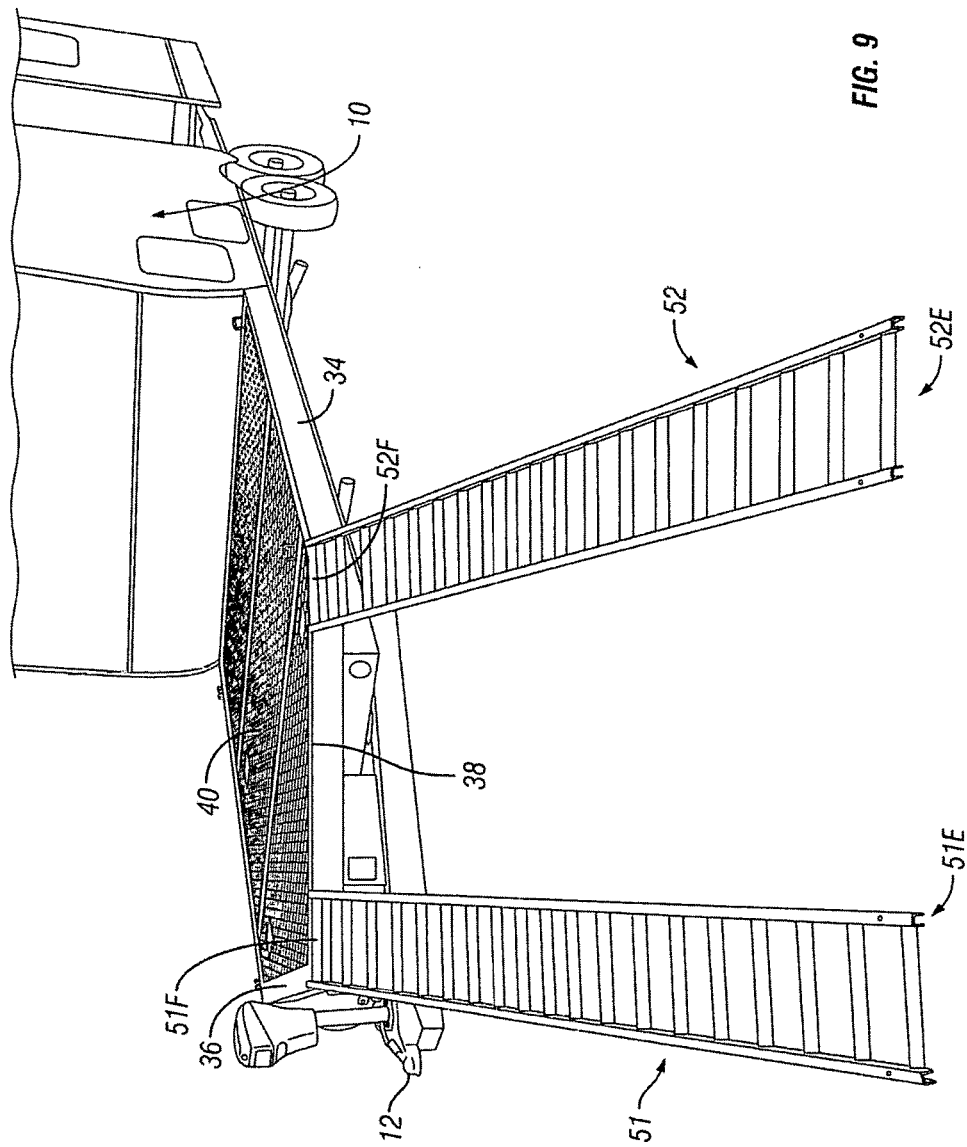
FIG. 9 is a perspective view of the recreational vehicle shown in FIG. 1 with certain components of the deck removed and positioned so as to form a ramp structure.

As also shown in FIG. 8, at second end 51E of first side member 51, upper member 51A nests within upper member 53A of first front member 53 and is secured thereto by inserting a pin and latch member 80 through openings in members 51A and 53A. Upper member 52A of second side member 52 is secured to upper member 54A of second front member 54 in the same manner as described above for first side member 51.

In a similar manner, first arm 64 and second arm 65 of support member 60 nest within upper members 53A and 54A and lower members 53B and 54B of first front member 53 and second front member 54 and are secured by inserting pin and latch members 80 through openings in those members and through openings 66 in arms 64 and 65.

First side member 51, second side member 52, first front member 53 and second front member 54 may be removed from support structure 30 by removing pin and latch members 80 and disengaging the members from support member 60, connection members 70 and from each other. Support member 60 may be removed from support structure 30 by removing the pins or other securing mechanisms located below support structure 30 and removing support structure 60 from opening 39. First side member 51 and second side member 52 can then be positioned along, for example, second front member 38 of support structure 30 such that support members 51F and 52F rest on support structure 30, thereby forming a ramp for loading, for example, ATV's or other wheeled vehicles. First side member 51, second side member 52, first front member 53 and second front member 54 may then be reattached to support structure 30 to enclose deck surface 40.

Although the present invention has been shown and described in detail, the same is to be taken by way of illustration only and not by way of limitation. Numerous modifications can be made to the embodiments disclosed without departing from the scope of the invention. For example, securement mechanisms other than pin and latch members 80 may be utilized. The nesting portions of members 51, 52, 53 and 54 and support structure 60 can also have different configurations that will permit them to be removably secured to each other. Connection members 70 may also take various configurations. Other modifications are also possible.

The invention claimed is:

1. A recreational vehicle having at least two walls for defining an interior space and a deck for supporting items exterior to the interior space of the recreational vehicle, including:
   a support structure having a first side support member having a first end adjacent a wall of the recreational vehicle and a second end, a second side support member having a first end adjacent a wall of the recreational vehicle and a second end, a first front support member having a first end connected to the second end of the first side support member and a second end, the first front support member extending at an angle from the first side support member and a second front support member having a first end connected to the second end of the second side support member and a second end connected to the second end of the first front support member, the second front support member extending at an angle to the second side support member;
   a deck surface connected to the first side support member, the second side support member, the first front support member and the second front support member;
   a first connection member connected to the first side support member;
   a second connection member connected to the first side support member;
   a third connection member connected to the second side support member;
   a fourth connection member connected to the second side support member;
   a first side enclosure member removably connectable to the first and second connection members;
   a second side enclosure member removably connectable to the third and fourth connection members;
   an enclosure support member having a first section having a first end removably connectable to the support structure adjacent the second ends of the first front support member and the second front support member and a second end, a first arm extending generally perpendicular to the first section between the first and second ends and a second arm extending generally perpendicular to the first section adjacent the second end;
   a first front enclosure member removably connectable to the first side enclosure member and the enclosure support member;
   a second front enclosure member removably connectable to the second side enclosure member and the enclosure support member;
   wherein the first side enclosure member, second side enclosure member, first front enclosure member and second front enclosure member can be connected to the deck support structure so as to fully or partially enclose the deck surface, and wherein the first side enclosure member and the second side enclosure member are positionable on the support structure so as to form a ramp for loading and unloading items from the deck surface.

2. The recreational vehicle of claim 1, wherein the second end of the first side enclosure member nests within the first end of the first front enclosure member when the first side enclosure member and first front enclosure member are connected to the support structure to at least partially enclose the deck surface.

3. The recreational vehicle of claim 1, wherein the first side enclosure member nests within the first connection member when the first side enclosure member is connected to the support structure to at least partially enclose the deck surface.

4. The recreational vehicle of claim 1, wherein the enclosure support member nests within the first front enclosure member when the first front enclosure member is connected to the support structure to at least partially enclose the deck surface.

5. The recreational vehicle of claim 4, wherein the first arm of the enclosure support member nests within the first front enclosure member when the first front enclosure member is connected to the support structure to at least partially enclose the deck surface.

6. The recreational vehicle of claim 5, wherein the second arm of the enclosure support member nests within the first front enclosure member when the first front enclosure member is connected to the support structure to at least partially enclose the deck surface.

7. The recreational vehicle of claim 4, wherein a portion of the enclosure support member nests within the second front enclosure member when the first front enclosure member and the second front enclosure member are connected to the support structure to at least partially enclose the deck surface.

8. The recreational vehicle of claim 1, further including an opening in the support structure adjacent the second end of the first front support member and the second end of the second front support member, the opening configured to receive the first end of the enclosure support member.

9. The recreational vehicle of claim 1, further including a first support member connected to the first end of the first side enclosure member, a second support member connected to the first end of the second side enclosure member and wherein the first and second support members are configured to support the first side enclosure member and the second side enclosure member on the support structure when the first side enclosure member and the second side enclosure member are positioned on the support structure to form a ramp.

10. The recreational vehicle of claim 9, wherein the first support member is disposed at an angle to the first side enclosure member and the second support member is disposed at an angle to the second side enclosure member.

11. The recreational vehicle of claim 1, wherein the first side support member, second side support member, first front support member and second front support member form a first generally rectangular area and a second generally triangular area.

12. The recreational vehicle of claim 1, wherein the first side support member, second side support member, first front support member and second front support member form a first generally square area and a second generally triangular area.

13. A recreational vehicle, including:
a deck, the deck having a first area having a first side and a second side and a second generally triangular area having a first side and a second side;
an enclosure structure having a first enclosure member removably connectable to the deck so as to extend along the first side of the first area of the deck, a second enclosure member removably connectable to the deck so as to extend along the second side of the first area of the deck, a third enclosure member removably connectable to the deck so as to extend along the first side of the triangular area of the deck and a fourth enclosure member removably connectable to the deck so as to extend along the second side of the triangular area of the deck, the first enclosure member being removably connectable to the third enclosure member and the second enclosure member being removably connectable to the fourth enclosure member;
a support member removably connectable to the deck, the support member having a first section extending generally perpendicular to the deck when the support member is connected to the deck, the first section having a first end and a second end, a first arm adjacent the first end of the first section and extending generally perpendicular to the first section and a second arm located between the first and second ends of the first section and extending generally perpendicular to the first section; and
wherein the third enclosure member is removably connectable to the first and second arms of the support member and the fourth enclosure member is removably connectable to the first and second arms of the support member.

14. The recreational vehicle according to claim 13, further including a first member connected to the first enclosure member and a second member connected to the second enclosure member, the first and second members configured to support the first enclosure member and the second enclosure member on the deck to form a ramp for loading and unloading items from the deck.

15. The recreational vehicle of claim 13, wherein the first enclosure member nests within the third enclosure member when the first enclosure member and third enclosure member are connected to the deck.

16. The recreational vehicle of claim 13, wherein the first and second arms of the support member nest within the third enclosure member when the third enclosure member is connected to the support member.

17. The recreational vehicle of claim 13, further including an opening adjacent the first and second sides of the triangular area of the deck, the opening configured to receive one end of the first section of the support member.

18. The recreational vehicle of claim 13, further including means for removably connecting the first enclosure member to the deck.

19. The recreational vehicle of claim 18, wherein the means for removably connecting the first enclosure member to the deck includes a bracket and a pin.

20. The recreational vehicle of claim 13, further including means for connecting the first enclosure member to the third enclosure member.

21. The recreational vehicle of claim 20, wherein the means for connecting the first enclosure member to the third enclosure member includes a pin.

* * * * *